(12) United States Patent
Zatloukal et al.

(10) Patent No.: US 7,240,117 B2
(45) Date of Patent: Jul. 3, 2007

(54) METHOD AND APPARATUS FOR PREVENTING OVERLOAD USING SCALED RECOVERY

(75) Inventors: Peter Zatloukal, Duvall, WA (US); David Byron Shefner, Seattle, WA (US)

(73) Assignee: Hall Aluminum LLC, Los Altos, CA (US)

( * ) Notice: Subject to any disclaimer, the term of this patent is extended or adjusted under 35 U.S.C. 154(b) by 797 days.

(21) Appl. No.: 09/825,907

(22) Filed: Apr. 4, 2001

(65) Prior Publication Data

US 2002/0147835 A1 Oct. 10, 2002

(51) Int. Cl.
*G06F 15/16* (2006.01)
*G06F 11/00* (2006.01)
(52) U.S. Cl. .................. 709/229; 709/232; 370/229
(58) Field of Classification Search ............. 709/237, 709/235, 232, 230, 234, 206, 203, 225, 229, 709/201; 370/229, 230, 236, 448; 710/36
See application file for complete search history.

(56) References Cited

U.S. PATENT DOCUMENTS

| | | | | |
|---|---|---|---|---|
| 6,032,189 | A * | 2/2000 | Jinzenji et al. | 709/235 |
| 6,115,748 | A * | 9/2000 | Hauser et al. | 709/234 |
| 6,185,184 | B1 * | 2/2001 | Mattaway et al. | 370/230 |
| 6,411,601 | B1 * | 6/2002 | Shaffer et al. | 370/230 |
| 6,411,998 | B1 * | 6/2002 | Bryant et al. | 709/224 |
| 6,717,915 | B1 * | 4/2004 | Liao et al. | 370/252 |
| 2002/0052956 | A1 * | 5/2002 | Seibold et al. | 709/225 |
| 2002/0103915 | A1 * | 8/2002 | Shuster | 709/229 |

* cited by examiner

*Primary Examiner*—Ario Etienne
*Assistant Examiner*—Uzma Alam
(74) *Attorney, Agent, or Firm*—Schwabe, Williamson & Wyatt, P.C.

(57) ABSTRACT

In the scaled recovery system of the present invention, clients delay for an additional period of time prior to attempting to access a previously unavailable resource that has since become available, rather than accessing the shared resource at full speed once an initial back off interval is over. Through the continual increment and decrement of client back off intervals, the present invention provides dynamic tuning of overall system load in the case of overloaded shared resources.

23 Claims, 7 Drawing Sheets

METHOD AND APPARATUS FOR PREVENTING OVERLOAD USING SCALED RECOVERY

FIELD OF THE INVENTION

The invention relates generally to the field of data processing and, in particular, to a method and apparatus for preventing overload using scaled recovery.

BACKGROUND OF THE INVENTION

In systems utilizing shared resources, it is sometimes possible for one or more shared resources to become unavailable for access by a client device. For example, a shared resource such as a file server may become unavailable for access by a client device due to an operating system or file system crash. Similarly, in an IEEE 802.3 compliant Ethernet based network utilizing the carrier sense multiple access/collision detection (CSMA/CD) protocol, the shared Ethernet medium that is engaged by a client will be considered unavailable (i.e. by detecting a collision) to all but the client accessing the medium. In either event, after detecting that a shared resource is unavailable, the clients may delay for a period of time referred to as a "back off" interval before attempting to access the shared resource again.

This approach provides two benefits: first, the client and communication system's workload is reduced while the shared resource is unavailable; and second, if the cause of the shared resource's unavailability is due to an overload in client accesses, an incremental back off will reduce the load on the shared resource thereby potentially remedying the problem. Such incremental back off systems, however, are limited. For example, if the shared resource is unavailable or non-responsive for a lengthy period of time, it is possible for a substantial backlog of clients attempting access to the shared resource to be created. When the shared resource becomes available again, clients will begin accessing the shared resource once each of their individual back off intervals is over. If the queue of clients waiting to access the shared resource is large, even though first-time re-accesses are staggered due to the back off interval times, the potential exists for the shared resource to become immediately overloaded once again due e.g. to the volume of near simultaneous accesses. Such an overload condition can render the resource non-responsive once again, causing a cycle of resetting the shared resource only to have it fail again under queued client load.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method and apparatus for preventing overload using scaled recovery is disclosed herein. In the following description, for purposes of explanation, specific numbers, materials and configurations are set forth in order to provide a thorough understanding of the invention. It will be apparent, however, to one skilled in the art that the invention may be practiced without these specific details. In some instances, structures and devices are shown in block diagram form in order to avoid obscuring the invention. In other instances, well-known features are omitted or simplified in order not to obscure the present invention. For ease of understanding, certain method steps are delineated as separate steps, however, these separately delineated steps should not be construed as necessarily order dependent in their performance. Furthermore, reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the scaled recovery system of the present invention, clients employ a scaled ramp up approach to accessing a shared resource when the shared resource becomes available after having been unavailable for a period of time. After an unsuccessful attempt to access a shared resource is made, the client delays for a period of time (referred to herein as a first back off interval) before attempting to access the shared resource again. For each successive unsuccessful attempt by the client to access the shared resource, the first back off interval is incrementally increased.

In one embodiment, upon determining that the shared resource has become available (i.e. accessible) after having been unavailable for a period of time, clients incorporating the teachings of the present invention delay for an additional period of time (referred to herein as a second back off interval) before reattempting to access the shared resource. In one embodiment, the second back off period is decreased each time the client successfully accesses the shared resource. Accordingly, through the continual increment and decrement of client back off intervals, the present invention incurs the additional benefit of dynamically tuning overall system load in the case of overloaded shared resources. That is, the present invention is further beneficial in circumstances where the shared resource experiences a higher client load than the shared resource can sustain.

Figure 1:
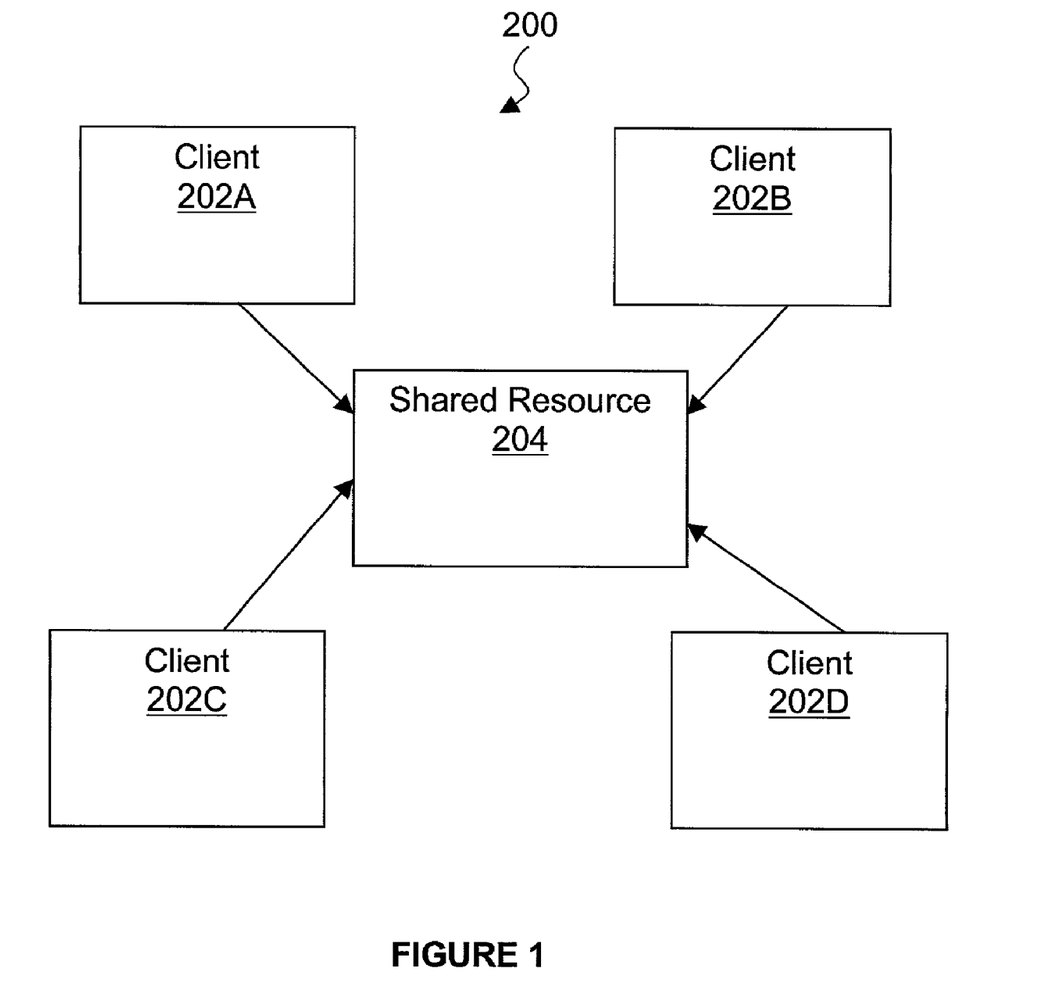
FIG. 1 illustrates an overview of the present invention.

FIG. 1 illustrates an overview of a system incorporated with the teachings of the present invention. As illustrated, system 200 includes shared resource 204 and a number of clients 202A–202D incorporated with the teachings of the present invention. In one embodiment, clients 202A–202D employ a ramped up approach to accessing shared resource 204 once it becomes available again, after having been unavailable for a period of time. In one embodiment, rather than accessing shared resource 204 at full speed once it becomes available after having been unavailable for a period of time, clients 202A–202D delay for a period of time corresponding to a second back off interval before attempting to access shared resource 204 once again.

Once the second back off interval expires, clients 202A–202D once again attempt to access shared resource 204. In one embodiment, if clients 202A–202D determine that shared resource 204 is once again unavailable after the expiration of the second back off interval, clients 202A–202D will determine a new first back off interval for which to delay prior to attempting to access shared resource 204. Conversely, if clients 202A–202D determine that shared resource 204 is available after the expiration of the second back off interval, the second back off interval is reduced and stored for use the next time shared resource 204 is determined to be unavailable. In one embodiment, clients 202A–202D successively reduce the second back off interval every time shared resource 204 is successfully accessed. Accordingly, the probability of shared resource 204 getting overwhelmed and becoming unavailable once again is advantageously reduced.

As will be apparent from the description to follow, shared resource 204 and clients 202A–202D represent a broad range of shared resources, and shared resource consuming devices of a variety of technical disciplines, including but not limited to wireless medium and wireless devices, networking medium and networking devices, local bus and bus agents, and data/content servers and data/content consuming agents.

Figure 2:
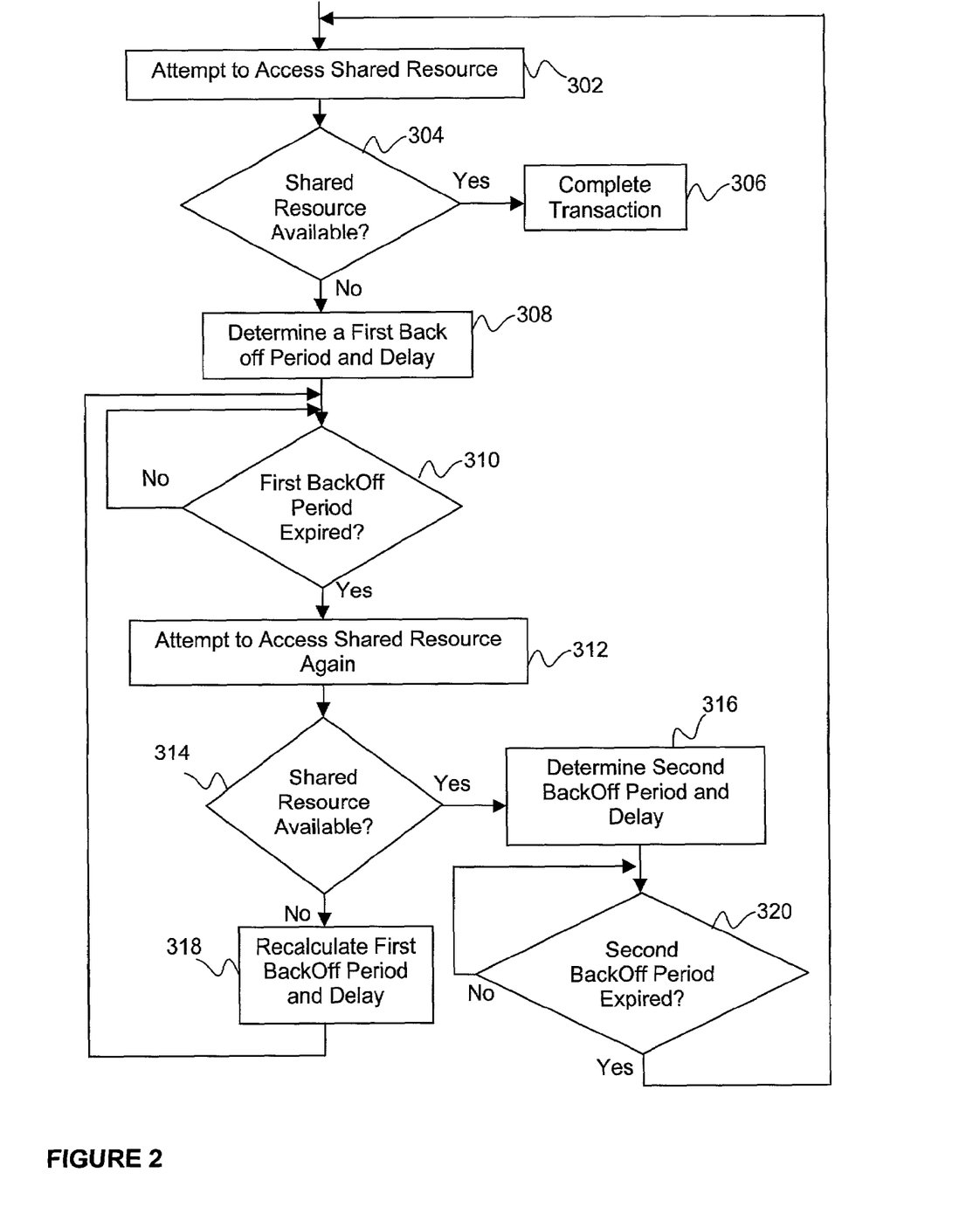
FIG. 2 illustrates a method view of the present invention.

FIG. 2 illustrates the operational flow of relevant aspects of the scaled recovery services of the present invention. At block 302, a device, such as client 202, attempts to access shared resource 204. At decision block 304, a determination is made as to whether the resource is available. The manner in which the determination is made is application dependent. In an Ethernet network for example, devices may make such a determination by sensing a carrier on the shared communications medium. In the event the shared resource is a server, however, devices may determine that the server is available by receiving an acknowledgement (i.e. "ACK") to a transmitted frame.

Upon determining that shared resource 204 is available at block 304, the device completes the transaction at block 306. However, if it is determined that shared resource 204 is unavailable or is otherwise non-responsive (e.g. due to a system crash) a first back off interval for the device is determined at block 308 where it is decremented until it expires. The manner in which the first back off interval is determined and decremented is also application dependent. In one embodiment, the first back off interval delay is determined in accordance with the truncated binary exponential back off (BEB) routine employed by the CSMA/CD protocol (i.e. $0 \leq r < 2^k$; where k=min (n, 10); r is an integer with a delay value ranging from zero to one less than the value of two to the exponent, k; and k is assigned a value that is equal to either the number of transmission attempts by client 202 or the number 10, whichever is less.) The first back off interval may likewise be determined in other manners such as algebraically and/or incrementally. At decision block 310, a determination is made as to whether the first back off interval has expired. In one embodiment, one or more counters are utilized to determine when the first back off interval expires.

Once the first back off interval has expired, the device once again attempts to access the shared resource at block 312, and makes a determination as to whether the shared resource is now available at decision block 314. If the shared resource is still unavailable, the first back off interval is recalculated at block 318 and the device delays in accessing the shared device until the recalculated first back off interval expires once again at block 310. In one embodiment, recalculation of the first back off interval includes merely incrementing the first back off interval, however, any number of arithmetic and/or algebraic operations may be utilized to recalculate the first back off interval. In one embodiment of the invention, a counter is utilized to store the number of unsuccessful attempts made by the device to access the shared resource. In one embodiment, the counter is not reset to zero once a successful attempt to access the shared resource is achieved. Accordingly, such a counter may be used to determine the duration of a second back off period (described more fully below).

If at block 314, it is determined that the shared resource is available, in accordance with one embodiment of the invention, the device does not immediately transmit a second or successive frames to the shared resource. Rather, at block 316, a second back off interval is determined for which the device will delay before transmitting another frame. In one embodiment of the invention, the second back off interval is determined based at least in part upon the number of unsuccessful attempts made by the device to access the shared resource. In an alternative embodiment, the second back off interval is determined independently of the number of unsuccessful attempts made by the device to access the shared resource.

At block 320, the second back off interval is decremented until the second back off interval expires. In one embodiment, the rate according to which the second back off interval is decremented is proportional to the rate at which the first back off interval was incremented (e.g., block 310). In another embodiment, the second back off interval is decremented at a rate that is unrelated to the rate according to which the first back off interval was decremented. Once the second back off interval expires at block 320, the device attempts to access the shared resource once again at block 304. If it is determined that the shared resource is available at block 304, the device completes the transaction at block 306. In one embodiment, additional second back off intervals are successively determined upon each successful access of the shared resource by a device. In one embodiment, each of the successive second back off intervals is less in duration than each of the previous first or second back off intervals.

The manner in which the operational logic illustrated by FIG. 2 is implemented is application dependent. A number of example implementations are described below in the context of the various applications being described, referencing the remaining figures.

Figure 3:
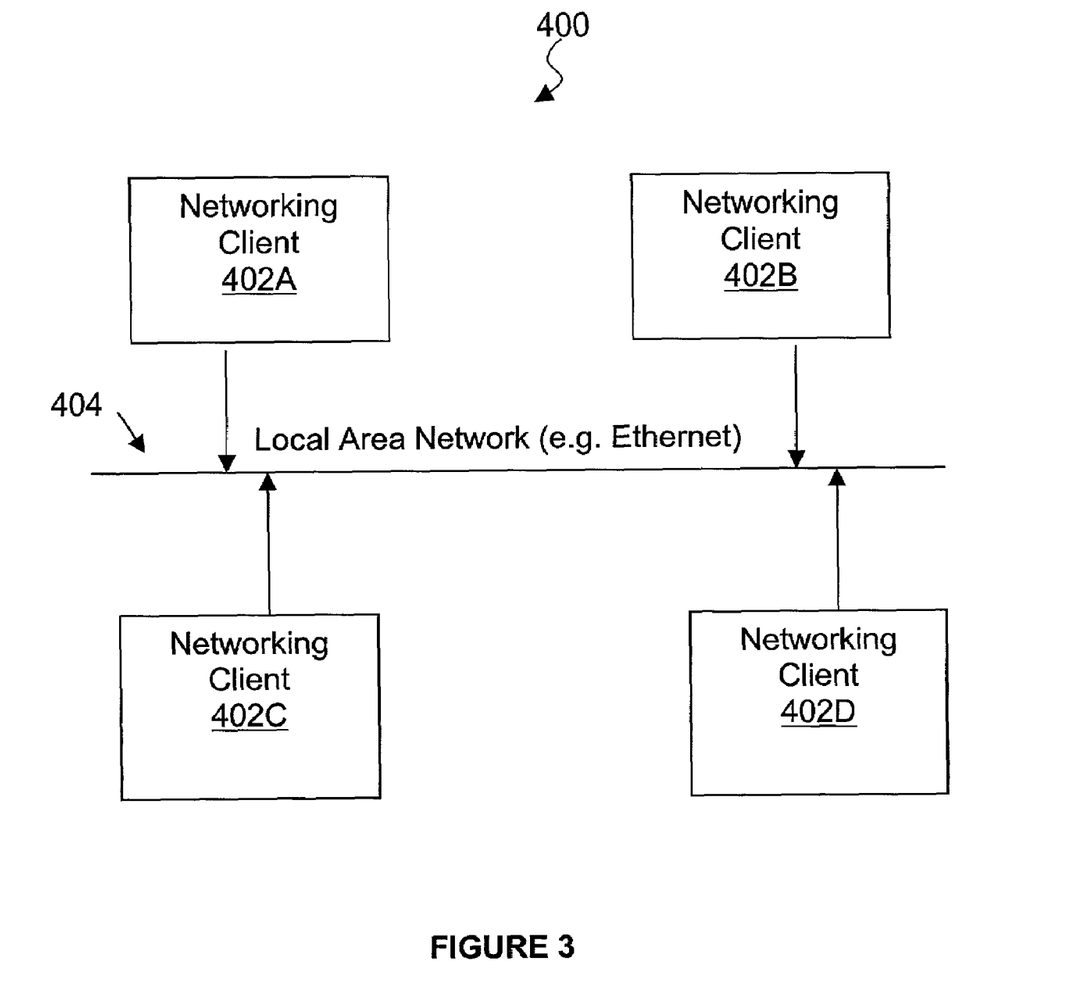
FIG. 3 illustrates a first application of the present invention to local area networking.

FIG. 3 illustrates one application of the present invention as it applies to the field of networking. As illustrated, local area network 400 includes networking medium 404 and a number of networking client devices 402A–402D incorporated with the teachings of the present invention. In one embodiment, networking medium 404 represents an IEEE 802.3 compliant Ethernet based network utilizing the carrier sense multiple access/collision detection (CSMA/CD) protocol, although networking medium 404 may likewise represent a broad range of other networking mediums including but not limited to twisted pair, coaxial cables, optical fiber and the like. Similarly, networking client devices 402A–402D represent a broad range of network client devices including but not limited to network enabled computer systems, set-top boxes, printers, RAID systems, and the like. For the illustrated embodiment, the operational logic described in association with FIG. 2 may be implemented e.g. in network interface cards (not shown) of networking client devices 402A–402D.

In accordance with one embodiment of the invention, networking client devices 402A–402D employ a ramped up approach to accessing networking medium 404 when it becomes available after having been unavailable for a period of time. After detecting a collision on networking medium 404 for example, networking client devices 402A–402D institute a first back off interval (i.e. in accordance with the IEEE 802.3 CSMA/CD protocol), before attempting subsequent accesses to networking medium 404. However, rather than accessing networking medium 404 at full speed once the first back off interval has expired and networking medium 404 becomes available, clients incorporating the teachings of the present invention institute a second back off interval for which they once again delay before accessing networking medium 404. As a result, the probability of networking medium 404 getting overwhelmed and becoming unavailable again is advantageously reduced.

Figure 4:
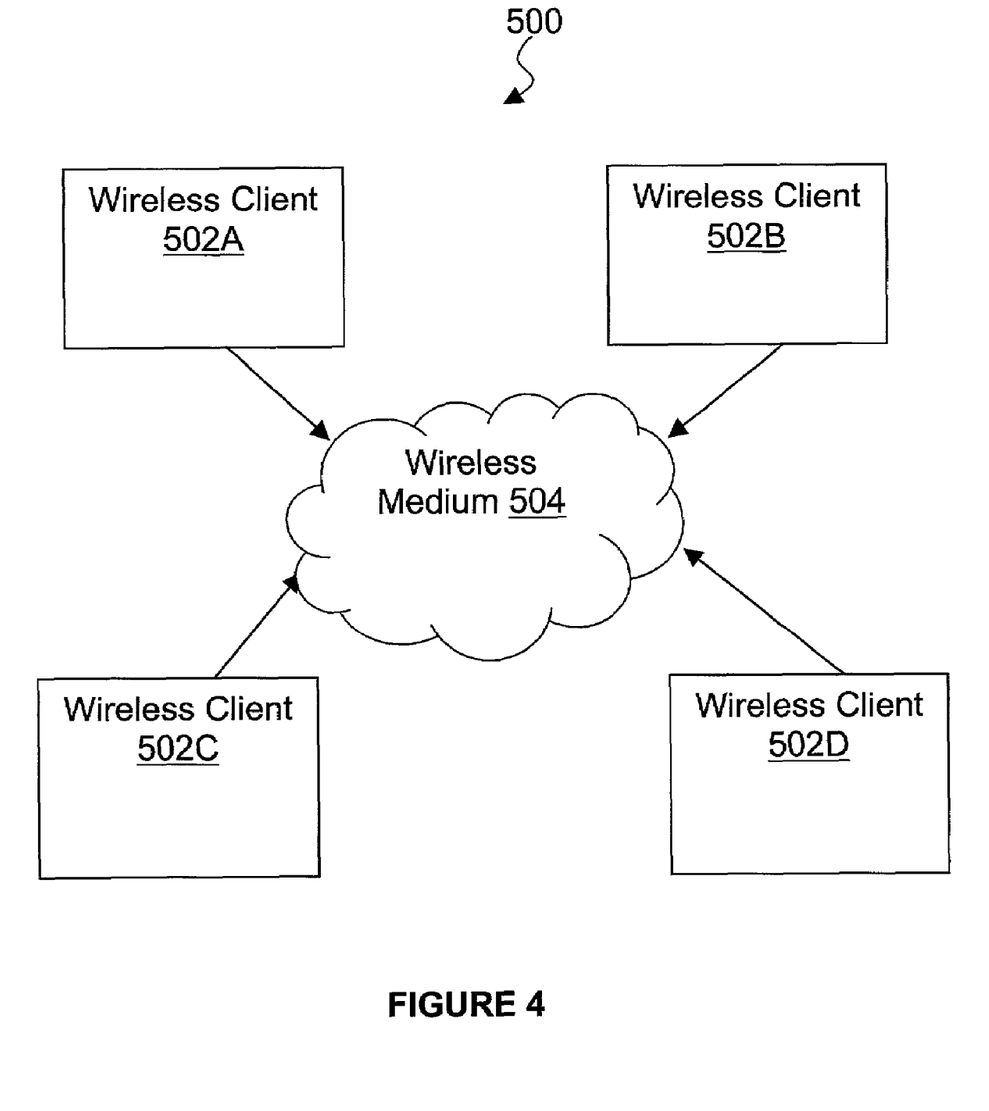
FIG. 4 illustrates a second application of the present invention to wireless communication.

FIG. 4 illustrates a second application of the present invention as it applies to wireless communication. As illustrated, wireless system 500 includes shared wireless medium 504 and a number of wireless client devices 502A–502D incorporated with the teachings of the present invention. Wireless medium 504 represents a broad range of such wireless mediums, including but not limited to Radio Frequency (RF) wireless medium, Infrared (IR) wireless medium, as well as other optical medium. Wireless client devices 502A–502D represent a broad range of such devices, including but not limited to wireless cell phones, wireless communication enabled personal digital assistants, and wireless communication enabled laptop/desktop computer systems to name just a few. For the illustrated embodiment, the operational logic described in association with FIG. 2 may be implemented e.g. in the transceivers of wireless client devices 502A–502D.

In the illustrated embodiment, wireless client devices 502A–502D employ a ramped up approach to accessing shared wireless medium 504 when it becomes available again, after having been unavailable for a period of time (i.e. signals from at least one of client devices 502A–502D having collided with signals from one or more other of client devices 502A–502D also attempting to access shared wireless medium 504). More specifically, rather than accessing shared wireless medium 504 at full speed once shared wireless medium 504 becomes available after having been unavailable for a period of time, client devices 502A–502D incorporating the teachings of the present invention institute a second back off interval representing a period of time for which the clients delay before accessing shared wireless medium 504 upon its becoming available. In one embodiment, wireless client devices 502A–502D successively reduce the second back off interval each time shared wireless medium 504 is successfully accessed by the respective client devices. As a result, the probability of shared wireless medium 504 getting overwhelmed and becoming unavailable again is advantageously reduced.

Figure 5:
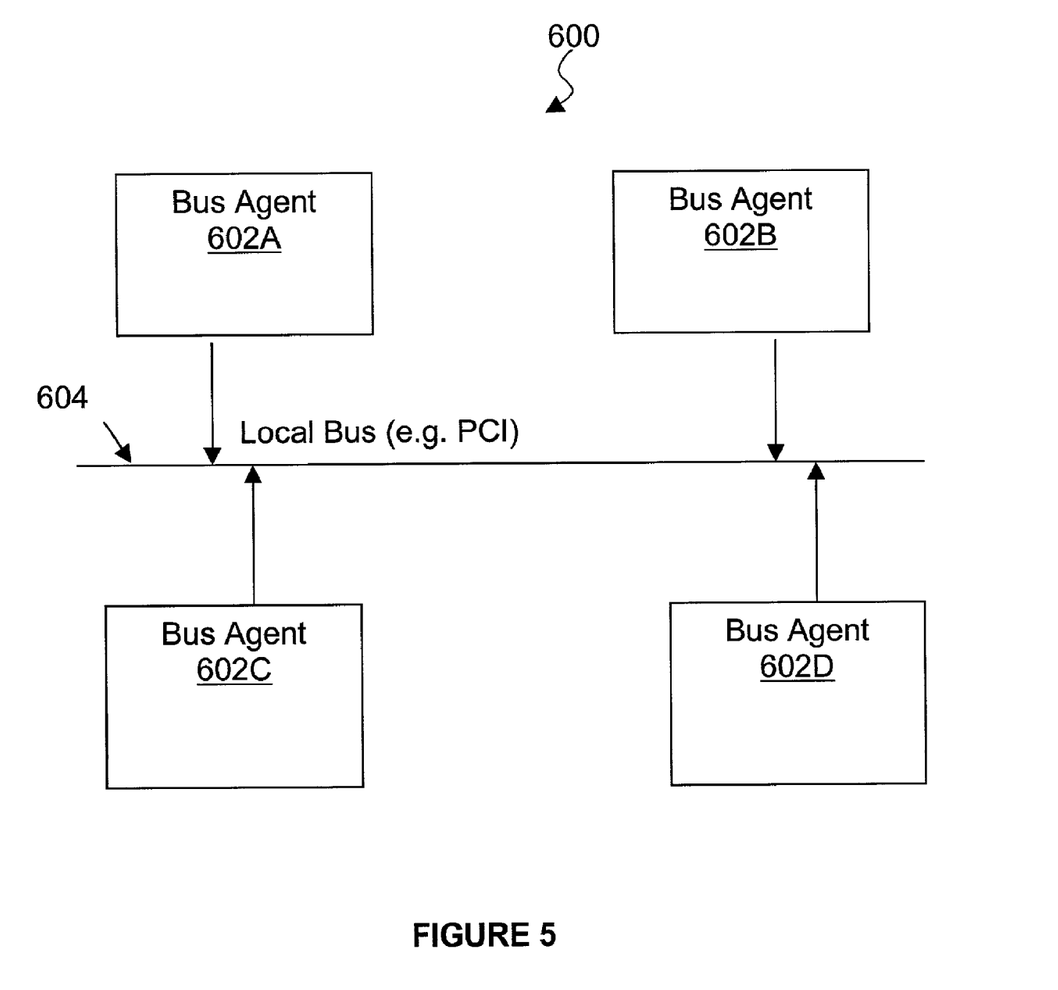
FIG. 5 illustrates a third application of the present invention to a local bus.

FIG. 5 illustrates a third application of the present invention as it applies to a local bus. As illustrated, local bus system 600 includes shared local bus (or buses) 604 and a number of bus agents 602A–602D incorporated with the teachings of the present invention. Local bus 604 represents a broad range of data communication buses including but not limited to the VESA bus, the PCI bus, the USB bus, IEEE 1394 High Performance Serial Bus, and the like. Bus agents 602A–602D represent a broad range of such devices including but not limited to disk controllers, memory controllers, graphic accelerators, video captures, and the like. In the illustrated embodiment, the operational logic described in association with FIG. 2 may be implemented e.g. in the bus interfaces of bus agents 602A–602D.

In accordance with the teachings of the present invention, bus agents 602A–602D employ a ramped up approach to accessing local bus 604 when it becomes available again, after having been unavailable for a period time (i.e. signals from at least one of bus agents 602A–602D having collided with signals from one or more other bus agents 602A–602D also attempting to access local bus 604). More specifically, rather than accessing local bus 604 at full speed once local bus 604 becomes available after having been unavailable for a period of time, bus agents 602A–602D incorporating the teachings of the present invention institute a second back off interval representing a period of time for which the agents delay before accessing local bus 604 upon its becoming available. In one embodiment, bus agents 602A–602D successively reduce the second back off interval each time local bus 604 is successfully accessed by the respective bus agent. As a result, load balancing may be advantageously achieved on shared local bus 604.

Figure 6:
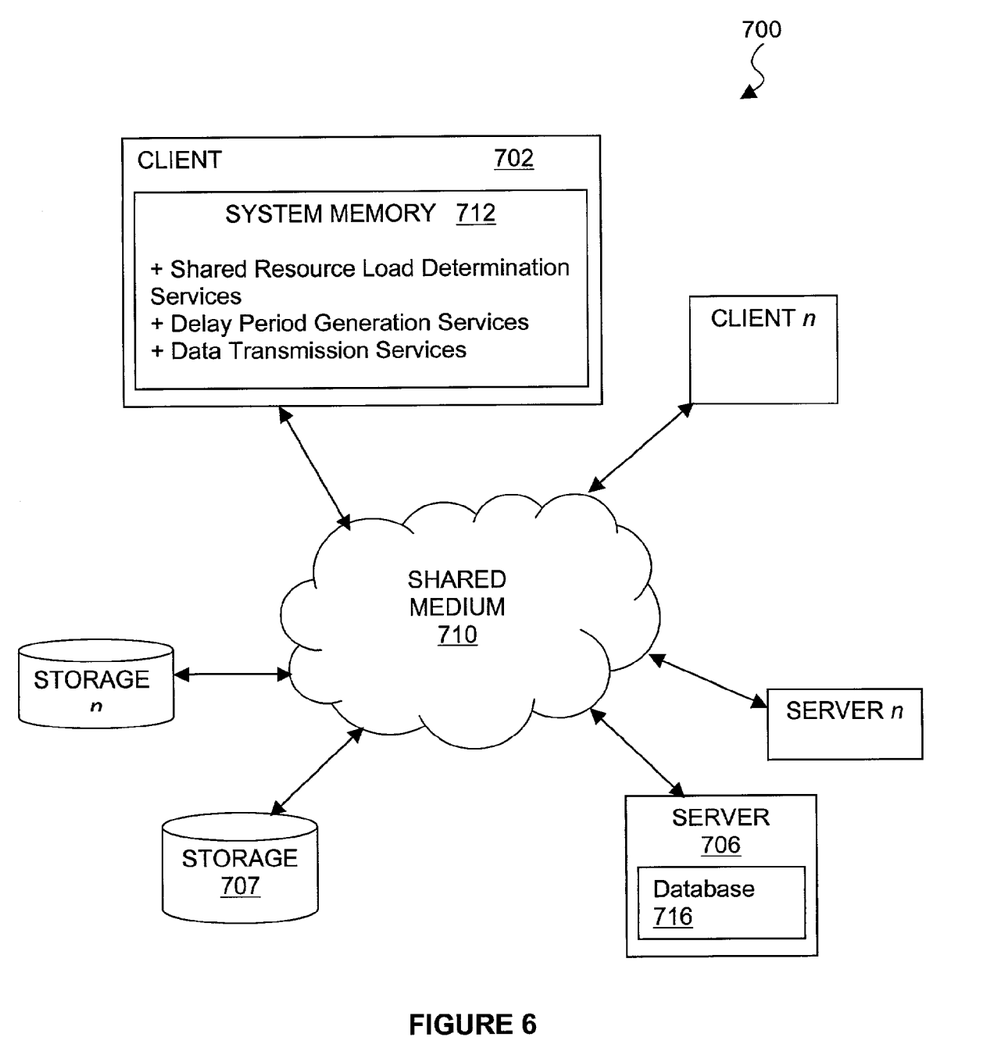
FIG. 6 illustrates a fourth application of the present invention to a distributed data processing system including multiple shared resources in accordance with one embodiment of the invention.

FIG. 6 is a graphical illustration of a fourth application of the present invention to distributed data processing systems including multiple shared resources, such as shared data/content databases, in accordance with one embodiment of the invention. Distributed data processing system 700 includes client 702, server 706, and data storage device 707, all of which are communicatively coupled to each other via shared medium 710. In one embodiment, shared medium 710 represents a shared resource such as a wired or wireless network utilized to transmit data between each of client 702, server 706, and data storage device 707. In some embodiments, distributed data processing system 700 may include a greater or fewer number of devices than those illustrated in FIG. 6, as well as addition devices not illustrated in FIG. 6, without departing from the spirit and scope of the present invention.

In the illustrated embodiment, server 706 represents a device to transmit data between one or more clients (such as client 702), and/or one or more data storage devices (such as data storage device 707). Server 706 includes data/content database 716 to facilitate in-place execution of programming instructions, as well as the retrieval and delivery of data/content to client 702. Client 702 represents one or more general-or special-purpose devices equipped to communicate with server 706 and/or data storage device 707 via shared medium 710. Client 702 further includes a "query" function, which may be a part of an application, such as a browser, requesting data/content from server 706.

The query function of client 702 advantageously includes the teachings of the present invention. In one embodiment, server 706 receives processing requests initiated by client 702 via shared medium 710. The greater the processing load placed upon server 706, whether due to requests received from client 702 or otherwise, the greater the likelihood is that server 706 will suffer a decrease in performance and/or experience a devastating crash. However, client 702 advantageously reduces the likelihood of successively overwhelming server 706 by practicing the "ramp up" technique of the present invention. Data storage device 707 represents one or more non-volatile memory devices such as a hard disk drive, DVD-ROM, DVD-RAM, etc. In one embodiment data storage device 707 may be directly coupled to server 706 rather than, or in addition to being communicatively coupled to server 706 through shared medium 710.

Figure 7:
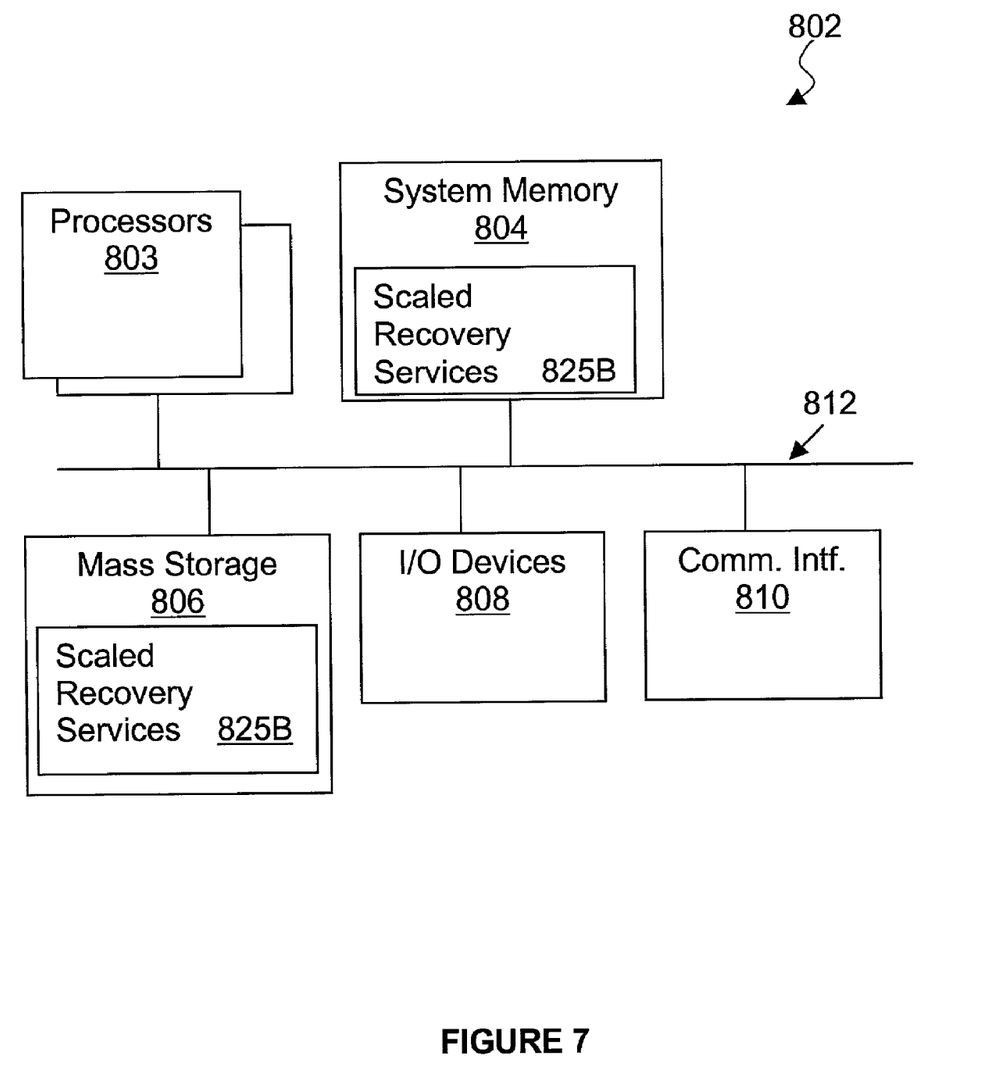
FIG. 7 illustrates an example computer system suitable for use as client 102 or another device to practice the present invention in the context of FIG. 6, in accordance with one embodiment.

FIG. 7 illustrates an example computer system suitable for use as client 702 or another device to practice the present invention, in accordance with one embodiment. As shown, computer system 802 includes one or more processors 803 and system memory 804. Additionally, computer system 802 includes mass storage devices 806 (such as diskette, hard drive, CDROM and so forth), input/output devices 808 (such as keyboard, cursor control and so forth) and communication interfaces 810 (such as network interface cards, modems and so forth). The elements are coupled to each other via system bus 812, which represents one or more buses. In the event system bus 812 represents multiple buses, the buses may be bridged by one or more bus bridges (not shown).

Except for the teachings of the present invention, each of the elements in illustrated in FIG. 7 provide conventional functionality. In particular, system memory 804 and mass storage 806 are employed to store a working copy 825A and a permanent copy 825B of the programming instructions implementing the scaled recovery aspects of the present invention. More specifically, in one embodiment, system memory 804 and mass storage 806 include programming instructions to implement numerous scaled recovery services including shared resource load determination services, delay period generation services, and data transmission services. The permanent copy of the programming instructions may be loaded into mass storage 806 in the factory, or in the field, as described earlier, through a distribution medium (not shown) or through communication interface 810 from a distribution server (not shown). The constitution of these elements 803–812 are known, and accordingly will not be further described.

Thus, the novel combination of a first back off interval (e.g., as described with respect to CSMA/CD) with the second back off interval of the present invention, facilitates a scaled recovery of overloaded systems as well as facilitating fair network access by contending devices. In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    attempting by a client to access a shared resource;
    detecting by the client that the shared resource is unavailable;
    determining by the client a first back off interval for the client to delay before reattempting to access the shared resource;
    successfully accessing the shared resource by the client, upon expiration of the first back off interval; and
    determining by the client, based on the successful access of the shared resource by the client, a second back off interval for the client to delay before reattempting to access the shared resource after said successful access, wherein the second back off interval is based at least in part on the number of unsuccessful attempts by the client prior to the successful access and/or on the determined first back off interval.

2. The method of claim 1, wherein said second back off interval is less in duration than said first back off interval.

3. The method of claim 2, further comprising:
    successively determining additional back off intervals upon each successful access of the shared resource by the client, without regard to availability of the shared resource, each of said successive back off intervals being less in duration than each previous back off interval.

4. The method of claim 1, wherein said attempting to access a shared resource comprises attempting to access a server device coupled to the client.

5. The method of claim 1, wherein said attempting to access a shared resource further comprises attempting to access a shared network.

6. The method of claim 5, wherein said shared network further comprises an Ethernet network.

7. The method of claim 5, wherein said shared network further comprises a wireless network.

8. The method of claim 1, wherein said attempting to access a shared resource further comprises attempting to access a data bus.

9. An apparatus comprising:
    a storage medium having stored therein a plurality of programming instructions for facilitating the apparatus in attempting to access a shared resource, detecting that the shared resource is unavailable, determining by a client a first back off interval for the client to delay before reattempting access to the shared resource, successfully accessing the shared resource upon expiration of the first back off interval, and determining by the client, based on the successful access of the shared resource by the client, a second back off interval for the client to delay before reattempting access to the shared resource after said successful access, wherein the programming instructions facilitate a determination of a second back off interval based at least in part on the number of unsuccessful attempts by the client prior to the successful access and/or on the determined first back off interval; and
    one or more processors coupled to the storage medium to execute the programming instructions.

10. The apparatus of claim 9, wherein said second back off interval is less in duration than said first back off interval.

11. The apparatus of claim 10, further comprising:
    programming instructions to further facilitate the apparatus in successively determining additional back off intervals without regard to availability of the share resource upon each successful access of the shared resource by the client, each of said successive back off intervals being less in duration than each previous back off interval.

12. The apparatus of claim 9, wherein said shared resource comprises a server device coupled to the client.

13. The apparatus of claim 9, wherein said shared resource comprises a shared network.

14. The apparatus of claim 13, wherein said shared network comprises an Ethernet network.

15. The apparatus of claim 13, wherein said shared network comprises a wireless network.

16. The apparatus of claim 9, wherein said shared resource comprises a data bus.

17. The apparatus of claim 9, further comprising:
    a counter to determine how many unsuccessful access attempts of the shared resource have been made by the client, wherein the counter value is not reset to zero upon the client successfully accessing the shared resource.

18. A machine accessible medium having stored therein a plurality of programming instructions for facilitating a client in attempting to access a shared resource, detecting by the client that the shared resource is unavailable, determining by the client a first back off interval for the client to delay before reattempting access to the shared resource, successfully accessing the shared resource by the client upon expiration of the first back off interval, and determining by the client, based on the successful access of the shared resource by the client, a second back off interval for the client to delay before reattempting access to the shared resource after said successful access, wherein the programming instructions facilitate the client in determining the second back off interval based at least in part on the number of unsuccessful attempts by the client prior to the successful access and/or on the determined first back off interval.

19. A method comprising:
   detecting by a client that a shared resource is unavailable;
   determining by the client a first time period for the client to delay before attempting to access the shared resource;
   upon expiration of the first time period, determining a new first time period for the client to delay before attempting to access the shared resource if the shared resource remains unavailable, and determining by the client, based on a successful access of the shared resource by the client, a second time period for the client to delay before reattempting to access the shared resource after the successful access of the shared resource by the client, wherein the second time period is based at least in part on the number of unsuccessful attempts by the client prior to the successful access, on the determined first time period and/or on the determined new first time period.

20. A system comprising:
   a system bus;
   a processor;
   an access module coupled to the system bus, and operated by the processor to access a shared resource; and
   a determination module operated by the processor to determine a first back off interval, based on an unsuccessful attempt to access the shared resource, for the access module to delay before reattempting access to the shared resource, and a second back off interval for the access module to delay before reattempting access to the shared resource after said successful access, the second back off interval being determined based on the successful access of the shared resource by the access module and based at least in art on the number of unsuccessful attempts by the client prior to the successful access and/or on the determined first back off interval.

21. The machine accessible medium of claim 18, wherein the programming instructions are adapted to further facilitate the client in successively determining additional back off intervals, upon each successful access of the shared resource by the client, each of said successive back off intervals being less in duration than each previous back off interval.

22. The method of claim 19, further comprising successively determining additional back off intervals, upon each successful access of the shared resource by the client, each of said successive back off intervals being less in duration than each previous back off interval.

23. The system of claim 20, wherein the determination module is further adapted to successively determine additional back off intervals for the access module, upon each successful access of the shared resource, each of said successive back off intervals being less in duration than each previous back off interval.

* * * * *